United States Patent [19]

Ruben

[11] 4,306,005

[45] Dec. 15, 1981

[54] ALKALINE PRIMARY CELL WITH CATHODE OF POTASSIUM PERMANGANATE WITH LITHIUM HYDROXIDE

[76] Inventor: Samuel Ruben, 52 Seacord Rd., New Rochelle, N.Y. 10803

[21] Appl. No.: 181,719

[22] Filed: Aug. 27, 1980

[51] Int. Cl.$^3$ .............................................. H01M 6/04
[52] U.S. Cl. .................................... 429/206; 429/224; 252/182.1; 252/506
[58] Field of Search ...................... 429/206, 224, 230; 106/286.8, 287.35; 252/182.1, 502, 506, 518

[56] References Cited

U.S. PATENT DOCUMENTS

| | | | |
|---|---|---|---|
| 2,463,316 | 3/1969 | Ruben | 429/224 |
| 2,536,696 | 1/1951 | Ruben | 429/224 X |
| 3,761,317 | 9/1973 | Sena, Jr. | 429/224 X |

*Primary Examiner*—Charles F. LeFevour

[57] ABSTRACT

The invention is a cathodic reactant for alkaline primary cells. It comprises intimately intermixed finely divided potassium permanganate and graphite, having added thereto a substantial quantity of powdered lithium hydroxide.

5 Claims, No Drawings

ALKALINE PRIMARY CELL WITH CATHODE OF POTASSIUM PERMANGANATE WITH LITHIUM HYDROXIDE

This invention relates to a cathodic reactant or depolarizer for sealed alkaline primary cells and to cells utilizing a cathodic reactant of potassium permanganate.

An object of the invention is to provide a sealed alkaline primary cell which effectively utilizes the high depolarizing capacity of potassium permanganate and which possesses good shelf life.

The use of potassium permanganate as a cathodic reactant has been considered and applied in the past. My U.S. Pat. No. 2,463,316 issued Mar. 1, 1949, illustrates the use of the permanganates as cathodic reactants capable of providing higher cell potentials and good coulombic capacities.

A typical cell comprised a cathodic reactant consisting of potassium permanganate and graphite, an amalgamated zinc anode and an electrolyte of zincated potassium hydroxide.

While these cells exhibited excellent early life characteristics, it was found that over a period of time, deterioration took place with excessive solubility of the depolarizer into the electrolyte and reduction on shelf of the permanganate by the electrolyte, resulting in limited shelf life and reduction in cell capacity. As a consequence, there has been no practical or commercial use of potassium permanganate cells to date, notwithstanding the obvious advantages of its high potential and coulombic capabilities.

I have found that if a saturated lithium hydroxide electrolyte having a zincate content is used with potassium permanganate-graphite as the effective reactant and an amalgamated zinc anode, that a long shelf life is obtained, compared with cells employing an electrolyte of potassium or sodium hydroxide. However, I have also found that there is a limitation on the extent of cathodic use in such lithium hydroxide electrolytic cells, since most of the reaction initially occurs on the side of the cathodic reactant pellet facing the anode. I have found that a hard low porosity reaction product is produced which allows only a fraction of the available cathodic capacity of potassium permanganate to be obtained. There does not appear to be a substantial utilization in depth of the depolarizing capacity of the cathodic reactant.

The present invention overcomes this limitation. I have found that if potassium permanganate and graphite are thoroughly mixed and milled together, that by adding a substantial amount of lithium hydroxide powder to the milled mixture, a complete use in depth of the depolarizing oxygen component of the cathode is obtained.

The following tabulation shows the results obtained with varying amounts of lithium hydroxide powder added to a milled mixture of 90% potassium permanganate and 10% graphite, and compressed into a pellet. The cells were of standard miniature size such as used in watches, hearing aids or cameras and utilized amalgamated zinc powder anodes, a liquid saturated lithium hydroxide electrolyte containing maximum lithium zincate in solution held within an absorbent spacer adjacent the anode and an ionically conductive non-cellulosic Permion barrier adjacent the cathodic reactant. The initial cell voltage of all cells was 1.82 volts.

| Percent of powdered Lithium Hydroxide added to Potassium Permanganate-Graphite Mix | Capacity of Cell |
| --- | --- |
| 0 | 17.8 mah |
| 5 | 27 mah |
| 10 | 53.9 mah |
| 15 | 63.2 mah |
| 20 | 90 mah |
| 25 | 80 mah |

The above values are relative to a specific size cell. With the small size cells, the larger percent of lithium hydroxide powder reduces the effective amount of the permanganate.

Duplicate cells, substituting powdered potassium hydroxide and powdered sodium hydroxide for the powdered lithium hydroxide, did not give the results tabulated above and showed substantially lower capacities, as well as considerably shortened shelf life.

The invention is applicable to all types of sealed alkaline primary cell structures, including flat, cylindrical, button and roll types, as disclosed in my various alkaline cell patents.

I claim:

1. A cathodic reactant for sealed primary alkaline cells comprising intimately intermixed finely divided potassium permanganate and graphite having added thereto a substantial quantity of lithium hydroxide powder.

2. The cathodic reactant of claim 1 characterized in that it consists preponderently of potassium permanganate.

3. The cathodic reactant of claim 1 characterized in that the amount of lithium hydroxide powder is in the order of 5% to 25% by weight of the cathodic reactant.

4. The cathodic reactant of claim 1 characterized in that the amount of lithium hydroxide powder added to the potassium permanganate-graphite mixture is approximately 20%.

5. A sealed alkaline primary cell comprising a cathodic reactant of intimately intermixed finely divided potassium permanganate and graphite having added thereto a substantial quantity of lithium hydroxide powder, an anode of amalgamated zinc and an aqueous electrolyte of zincated lithium hydroxide.

* * * * *